United States Patent [19]

Engelhardt

[11] Patent Number: 4,788,534
[45] Date of Patent: Nov. 29, 1988

[54] WIND ALARM SENSOR

[76] Inventor: Bernard Engelhardt, 51 Abbeywood Trail, Don Mills, Ontario, Canada, M3B 3B4

[21] Appl. No.: 871,290

[22] Filed: Jun. 6, 1986

[51] Int. Cl.$^4$ .............................................. G01W 1/00
[52] U.S. Cl. .................................. 340/601; 340/984; 73/189; 200/81.9 M; 335/205
[58] Field of Search ................. 73/189, 188; 116/284; 340/601, 610, 984, 985, 986, 987; 200/81.9 M; 335/205, 207; 114/144 C

[56]  References Cited
U.S. PATENT DOCUMENTS

| | | | |
|---|---|---|---|
| 3,373,606 | 3/1968 | Guidi | 73/189 |
| 3,964,038 | 6/1976 | Rutherford | 73/189 X |
| 4,031,754 | 6/1977 | Bedard | 73/188 |
| 4,078,425 | 3/1978 | Busch et al. | 116/284 X |
| 4,227,406 | 10/1980 | Coffey | 73/188 |
| 4,454,757 | 6/1984 | Weinstein et al. | 73/189 |
| 4,673,924 | 6/1987 | Taylor | 340/601 |

*Primary Examiner*—Joseph A. Orsino
*Assistant Examiner*—Jeffery A. Hofsass
*Attorney, Agent, or Firm*—Fleit, Jacobson, Cohn & Price

[57] ABSTRACT

A frame member having two side walls and two end walls surround a cavity, and a cylindrical member is supported for pivoting in the cavity of the frame member. A magnet is mounted on a side of the cylindrical member, and at least one magnetic switch is mounted on a side wall of the frame adjacent to the magnet. When the cylindrical member pivots beyond the predetermined angle, the magnetic switch will be actuated.

2 Claims, 2 Drawing Sheets

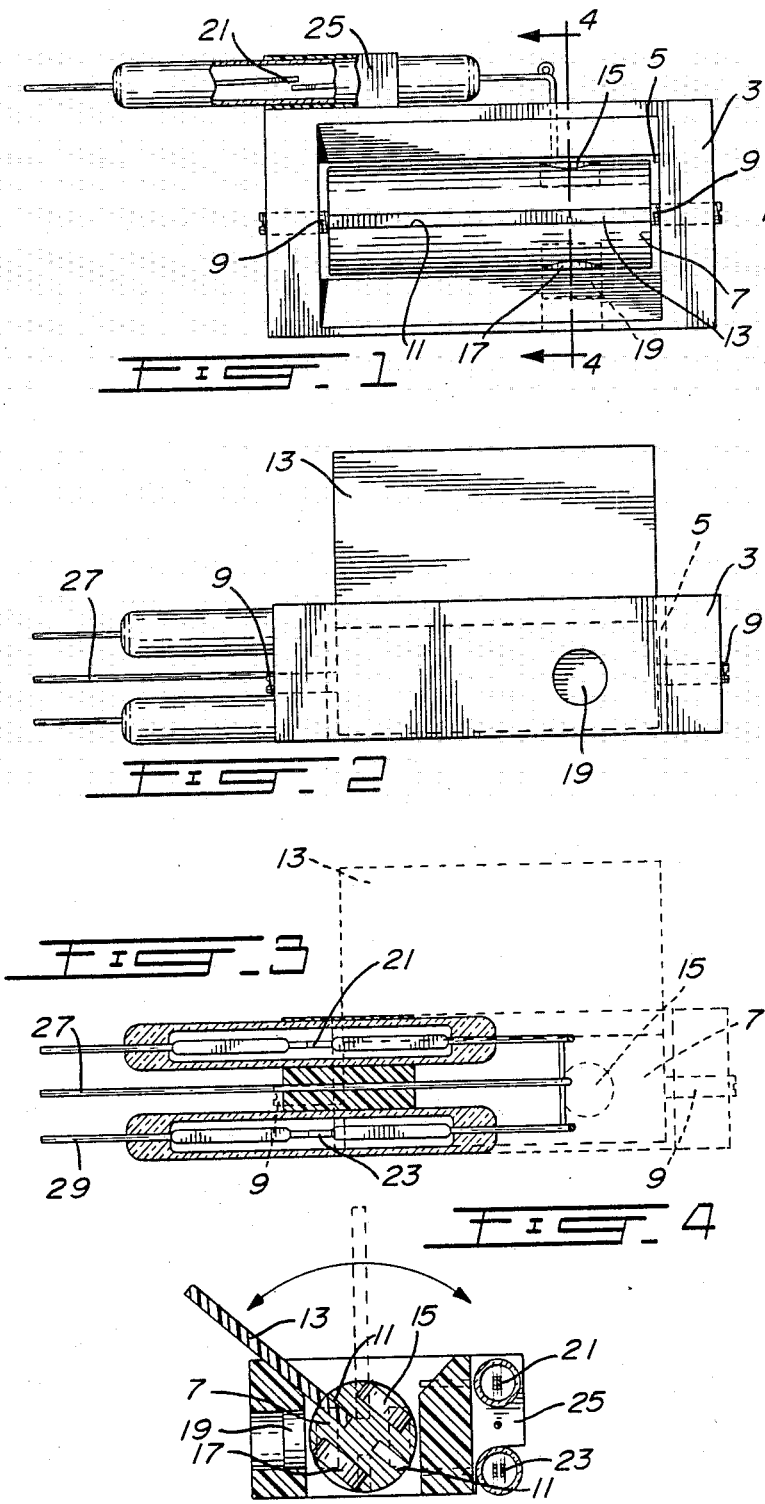

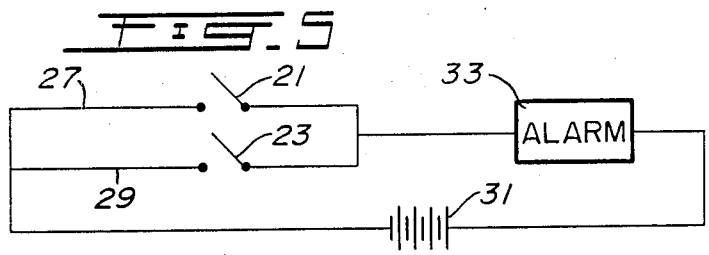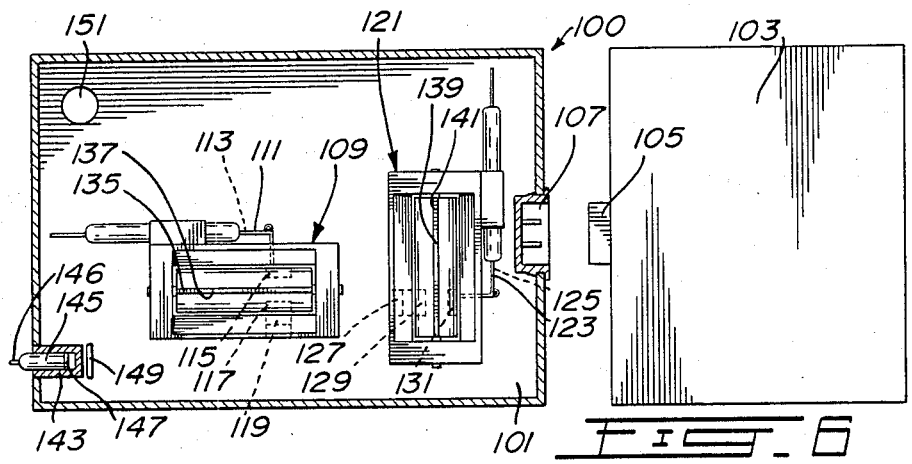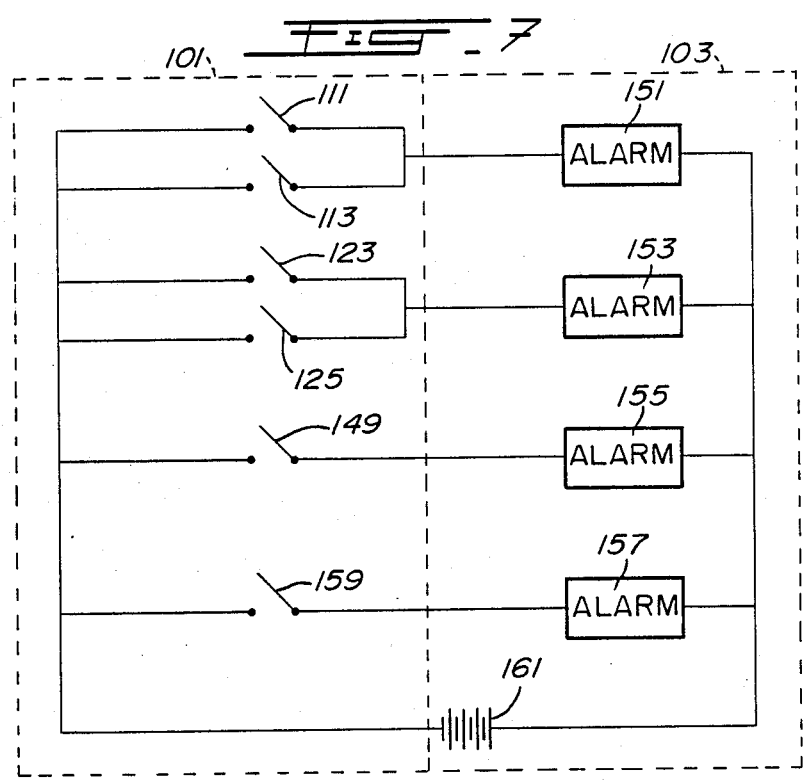

WIND ALARM SENSOR

BACKGROUND OF THE INVENTION

1. Field of the Invention

The invention relates to a wind alarm sensor. The invention also relates to a wind alarm indicator using one or more of the wind alarm sensors.

2. Description of the Prior Art

Wind indicators are known in the art as is illustrated in, for example, U.S. Pat. Nos. 3,964,038, June 15, 1976, Rutherford, 3,373,606, Mar. 19, 1968, Guidi, and 4,454,757, June 19, 1984, Weinstein et al.

The Rutherford patent teaches a device wherein the tripping of the switch indicates the existence of wind at or above a given strength. In this patent, the wind is caught by the cylinder 27. When a wind of great enough strength is caught, the cylinder 27, and its arm 22, are tilted into a position as shown in dotted lines in FIG. 1 of the patent. A bottom corner of the surface 19 will then press down on the member 17 to thereby activate switch 16 which then trips an alarm 34.

The Guidi patent teaches rotating cylinders 26 and 27 for measuring wind velocity. The Weinstein patent teaches the use of vanes to catch the wind.

None of the above references teach a sensor or indicator which is in any way similar to the indicator as taught and claimed herein.

SUMMARY OF INVENTION

In accordance with the invention there is provided a wind alarm sensor which includes a frame member having two side walls and two end walls surrounding a cavity. A pivoting member is supported for pivoting motion in the cavity of the frame member. A first magnetic means is mounted on the pivoting member. A magnetic switch means is mounted on a side wall of the frame member adjacent the first magnetic means. Thus, when the pivoting member pivots beyond a predetermined angle, the magnetic switch means will be actuated by the first magnetic means.

The invention also relates to a wind alarm indicator which includes one or more of the wind alarm sensors.

BRIEF DESCRIPTION OF DRAWINGS

The invention will be better understood by an examination of the following description, together with the accompanying drawings, in which:

FIG. 1 is a top view of the sensor;

FIG. 2 is a front view of the sensor;

FIG. 3 is a rear view of the sensor;

FIG. 4 is a section through IV—IV of FIG. 1;

FIG. 5 is a schematic diagram of an alarm circuit using the sensors of FIGS. 1 to 4;

FIG. 6 illustrates a wind indicator using two sensors as illustrated in FIGS. 1 to 4; and FIG. 7 is a schematic electrical diagram of the alarm circuits wherein each condition is separately alarmed.

DESCRIPTION OF PREFERRED EMBODIMENTS

Referring to FIGS. 1 to 4, the wind sensor, illustrated generally at 1, comprises a frame 3 with two side walls and two end walls surrounding a cavity 5 disposed therein. Disposed in the cavity is a pivoting member 7 which is mounted to pivot within the cavity on shaft 9.

Extending longitudinally of the pivoting member is a slot 11 for mounting a vane 13. The sensor is in its normal condition when the slots 11 are aligned parallel to the side walls of the frame.

Permanent magnets 15 and 17 are mounted in alignment with each other in the sides of the pivoting member which, in the embodiment illustrated in FIGS. 1 to 4, comprises a cylinder. Permanent magnet 19 is embedded in one side wall in alignment with the magnets 15 and 17.

Magnetic read switches 21 and 23 are mounted along the rear side wall on a mounting means 25, and are at equal distance above or below the centerline of magnet 15.

Leads 27 and 29 extend from switches 21 and 23 respectively.

In operation, the sensor works as follows:

When the vane 13 catches the wind, it causes the pivoting member 7 to pivot about the shaft 19. When the wind is strong enough to pivot the member 7 through, or above, a predetermined angle, then the switch 15 will activate one of the switches 21 or 23. Specifically, referring to FIG. 4, if the wind causes counter-clockwise pivoting, then magnet 15 will activate switch 21. If the wind is such as to cause clockwise pivoting, then the magnet 15 will activate switch 23.

Referring now to FIG. 5, it is seen that the switches 21 and 23 are arranged in parallel in a circuit which also includes a battery 31 and alarm mechanism 33. When either switches 21 or 23 are activated, the circuit is completed and the alarm will sound.

In order to adjust the magnitude of the wind which sounds the alarm, the size or attitude of the vane 13 is varied. Thus, the length or width dimensions of the vane could be varied. Alternatively, considering FIG. 2, the vane 13 could be rotated through an angle of 90° so that it would be upright along its long axis.

In addition, the magnitude of wind to cause an alarm signal could be adjusted by adjusting the strength or position of the magnet 15.

With the inventive sensor, the vane 13 will be returned to a normal upright position by the action of magnets 19 and 17. Because of the attractive force between the magnets, when no force is applied to the vane 13, the cylinder 7 will rotate until magnets 17 and 19 are in alignment. Thus, the provision of magnets 17 and 19 in their respective positions in the cylinder and the side wall of the frame provides a return to normal mechanism which does not require the use of a spring.

An advantage of the above-described sensor is that the entire sensor can be enscapulated, leaving only an opening for the cavity so that the vane can be inserted in the slot. In this regard, the vane is preferably removable, but could, of course, be made integral, with the cylinder 7, or be permanently installed therein.

In addition, the reed switches 21 and 23 are actuated by the presence of a magnetic field from the magnet 15. There are also available magnetic reed switches which are activated by the absence of a magnetic field. Such a reed switch could, of course, be also used. If such a reed switch is used, then it would be disposed in alignment with the magnets 15 and 17, and would be held open by the action of the magnetic field. The switch would be actuated, that is, it would close, upon removal of the magnetic field, i.e., by pivoting the cylinder 7.

It can be seen that the magnitude of the wind which will trip the alarm is a function of the angle through which the cylinder 7 must pivot (as determined by the relative position of switches 21 and 23), the dimensions and attitude of the vane 13, and the strength and position of magnet 15. The pivoting angle and the strength and position of magnet 15 are shop adjustments which would be made by the manufacturer. Within the parameters as set by the manufacturer, the wind magnitude can be varied by varying the dimensions or attitude of the vane 13.

Turning now to FIG. 6, there is illustrated in FIG. 6 a wind alarm indicator, illustrated generally at 100, and consisting of a sensor box 101 and an alarm and battery box 103. The box 103 can be mechanically and electrically connected to the box 101 by a jack and plug arrangement, for example, jack 105 and plug 107. Alternatively, the boxes can be electrically connected by a cable (not shown) which would include a jack at one end to mate with the plug 107 in box 101, and a plug at the other end to mate with jack 105 of the box 103. Using a cable, it is possible to locate the sensor box on, for example, the deck of a sailboat, and the box 103 in the sleeping quarters of the same boat. If the wind indicator is being used on a farm, then the sensor box 101 can be located in the fields, and the alarm battery box 103 can be located in the farmer's home.

The sensor box 101 includes a first sensor 109, which includes magnetic reed switches 111 and 113 (switch 113 is directly below switch 111), as well as magnets 115, 117 and 119. Disposed at right angles to the sensor 109 is a sensor 121 which includes magnetic reed switches 123 and 125 as well as magnets 127, 129 and 131. A vane 135 is disposed in slot 137 of sensor 109, and a vane 139 is disposed in slot 141 of sensor 121.

The alarm also includes an anchor loss detector comprising a cavity 143 into which is inserted a member 145 having a magnet 147 at the inner end thereof. Disposed adjacent the cavity 143 is the magnetic reed switch 149. A cord or other flexible member 146 is attached to the member 145 at one end, and, at the other end, is attached to the anchor chain. If the anchor should break loose, then the member 145 will be pulled out of the cavity 143. The switch 149 is of the type, above-mentioned, which is activated by removal of the magnetic field. Accordingly, as will be seen below with respect to the description of FIG. 7, when the member 145 is pulled out of the cavity, the alarm will be sounded.

As a further feature, the alarm device can include a rain alarm which comprises a cavity 151. Disposed on either side of the cavity are two wires. When the water in the cavity rises above the level of the wires, then the wires will be electrically connected to complete an alarm circuit as will be discussed with respect to FIG. 7.

The switches can be connected up in parallel, as in FIG. 5, so that any monitored condition will sound a single alarm. Alternatively, they can be connected up as shown in FIG. 7. As seen in FIG. 7, each condition is connected to a separate alarm 151, 153, 155 or 157. In FIG. 7, the filling up of the cavity 151 to an alarm condition is illustrated by switch 159. With the arrangement illustrated in FIG. 7, a different type or tone of alarm could be sounded for each condition so that the user will be aware of which condition has exceeded the boundaries merely by listening to the alarm.

In operation, the indicator illustrated in FIG. 6, when adapted for use on a sailboat, would work as follows:

The sensor would be placed on the deck of the boat and the appropriate vanes inserted in the slots 137 and 141. The sensor would be turned so that one of the vanes is facing the prevailing wind (at right angles to the wind), so that the second vane will be parallel with the wind. The first of the vanes will then detect when the wind exceeds a predetermined magnitude. The second of the vanes will detect a shift in the wind exceeding a predetermined angle. Obviously, it will also detect when the boat itself has shifted through the same predetermined angle relative to the direction of the wind.

The cord 146 is attached to the anchor chain to detect a break of the anchor chain or loss of the anchor, and the cavity 151 will detect rainfall exceeding a predetermined depth.

Although a particular embodiment has been described, this was for the purpose of illustrating, but not limiting, the invention. Various modifications, which will come readily to the mind of one skilled in the art, are within the scope of the invention as defined in the appended claims.

I claim:

1. A wind alarm sensor comprising:
   a frame member;
   a pivoting member supported for pivoting motion in said frame member;
   magnetic means for maintaining said pivoting member in an erect condition when said wind is less than a predetermined velocity;
   switch means;
   wherein, when the velocity of said wind is below a predetermined level, said magnetic means will maintain said pivoting member erect; and
   when said wind velocity exceeds said predetermined level, said wind will cause said pivoting member to pivot to thereby actuate said switch.

2. A sensor as defined in claim 1 wherein said pivoting member comprises a vane supported for pivoting at one end thereof.

* * * * *